US007482996B2

(12) United States Patent
Larson et al.

(10) Patent No.: US 7,482,996 B2
(45) Date of Patent: Jan. 27, 2009

(54) HEAD-UP DISPLAY

(75) Inventors: Brent D Larson, Cave Creek, AZ (US); Matthew B. Dubin, Tucson, AZ (US); Elias S. Haim, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 761 days.

(21) Appl. No.: 10/879,882

(22) Filed: Jun. 28, 2004

(65) Prior Publication Data

US 2006/0007055 A1     Jan. 12, 2006

(51) Int. Cl.
*G09G 5/00*     (2006.01)
(52) U.S. Cl. .......................................... 345/7; 359/630
(58) Field of Classification Search ................. 345/7–9; 348/53, 54, 58; 359/485, 487, 629, 630
See application file for complete search history.

(56) References Cited

U.S. PATENT DOCUMENTS

| 5,912,650 | A | 6/1999 | Carollo |
| 6,717,668 | B2* | 4/2004 | Treado et al. ............... 356/327 |
| 6,797,396 | B1* | 9/2004 | Liu et al. ..................... 428/483 |
| 7,088,405 | B2* | 8/2006 | Kotchick et al. ............ 349/114 |
| 7,158,095 | B2* | 1/2007 | Jenson et al. .................... 345/7 |
| 7,271,863 | B2* | 9/2007 | Paukshto et al. .............. 349/96 |

2002/0008909 A1    1/2002   Nishikawa et al.

FOREIGN PATENT DOCUMENTS

| EP | 0 424 950 A2 | 10/1990 |
| EP | 0 977 071 A1 | 2/2000 |
| JP | 05131866 | 5/1993 |
| JP | 11249062 | 9/1999 |

OTHER PUBLICATIONS

PCT International Search Report PCT/US2005/022702, Oct. 27, 2006.

* cited by examiner

*Primary Examiner*—Richard Hjerpe
*Assistant Examiner*—Tom V Sheng
(74) *Attorney, Agent, or Firm*—Ingrassia Fisher & Lorenz, P.C.

(57) ABSTRACT

Methods and apparatus are provided for a combined image on a head-up display. A data image display provides a first part of a combined image. An optical input provides a second part of the combined image, e.g., the background scene. A combiner superimposes the first and second parts to provide the combined image to the viewer. The data image display preferentially delivers s-polarized light to the combiner, which has a selective reflectance region for preferentially reflecting s-polarized light in a wavelength region of interest. In a preferred embodiment, the data image display comprises a backlight, a liquid crystal layer and two polarizers oriented so that the data images directed toward the combiner are s-polarized with respect to the selective reflectance region. A polarization rotation element may also be used in the data image display to facilitate s-polarization orientation.

23 Claims, 5 Drawing Sheets

HEAD-UP DISPLAY

TECHNICAL FIELD

The present invention generally relates to displays, and more particularly relates to head-up displays.

BACKGROUND

It is known in the art to provide users with a transparent viewing screen through which they are able to see, for example, approaching terrain, objects or other far-field or background scene, on which is superimposed various messages, instrument readings or other data. The superimposed information is transparent and appears to float in space in front of the far-field or background scene being viewed through the display. This type of display is commonly referred to as a "head-up display" since the user is able to see the superimposed information without having to look away from the far field or background scene or object.

While current head-up displays are very useful may suffer from a number of disadvantages well known in the art. For example, current head-up displays usually employ cathode ray tube (CRT) image sources for the superimposed information. CRT sources are comparatively fragile, may consume more power than is desired, may generate significant heat, and may be undesirably bulky. Attempts to employ flat panel liquid crystal displays (LCDs) have not yet achieved widespread success, in part because of the difficulty of providing sufficient luminance for the superimposed information.

Accordingly there continues to be a need for improved flat-panel head-up displays. In addition, it is desirable that the head-up display be able to employ conventional LCD technology for the superimposed information or other data desired to be displayed. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for presenting a combined image in a head-up display. A data image display provides a first part of a combined image. An optical input provides a second part of the combined image, e.g., a background scene. A combiner superimposes the first and second parts to provide the combined image to the viewer. The data image display preferentially delivers s-polarized light to the combiner, which has a selective reflectance region for preferentially reflecting s-polarized light toward the viewer in a wavelength region of interest. In a preferred embodiment, the data image display comprises a backlight, a liquid crystal layer and two polarizers oriented so that the data images directed toward the combiner are s-polarized with respect to the selective reflectance region. A polarization rotation element may also be used in the data image display to facilitate s-polarization orientation.

A method is provided for presenting a combined optical image in a head-up display. The method comprises, in either order generating a data image having s-polarization with respect to a surface of a tilted plate combiner and receiving a background scene image, and then directing both the data image and the background scene image to the combiner, then selectively reflecting the s-polarized data image off the combiner towards the viewer while transmitting the background scene image through the combiner towards the viewer who perceives them as a combined image.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description. For convenience of description the words "background scene" are used to refer to the (e.g., far field) scene that a viewer sees looking through the combiner of a head-up display. The word "data" is used to refer to whatever graphics, text, numbers, letters or other images are being generated by the data source of the head-up display and superimposed on the background scene and the word "combiner" is used to refer to the semi-transparent, semi-reflecting optical plate in the field of view of the user that combines the background scene and data images so that they appear to the viewer to be superimposed. Such terminology is conventional.

Figure 1:
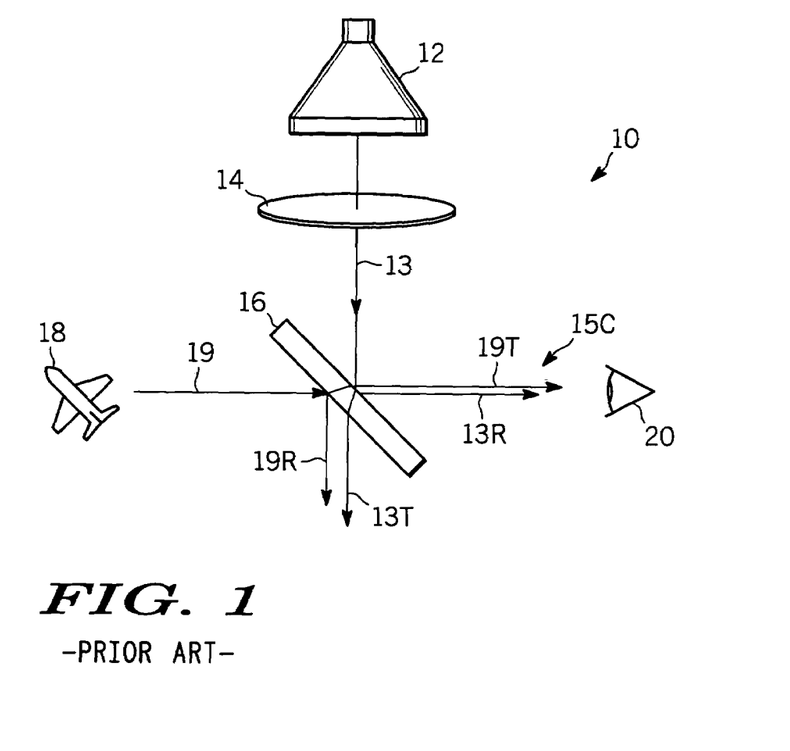
FIG. 1 is a simplified side view of a head-up display employing a CRT data display source, according to the prior art.

FIG. 1 is a simplified side view of head-up display 10 employing CRT data display or image source 12, according to the prior art. Image source 12 produces data image 13. Relay optics 14 transfers data image 13 to combiner 16, where portion 13R is reflected toward viewer 20 and portion 13T is transmitted. Light rays 19 emitted by background scene or object 18 impinge on combiner 16, and portion 19T is transmitted to viewer 20 and portion 19R is reflected. Data image 13R and background scene image 19T arrive at viewer 20 as combined optical signal 15C. To observer 20 viewing combined optical signal or image 15C, data image 13R and background image 19T appear superimposed.

Figure 2:
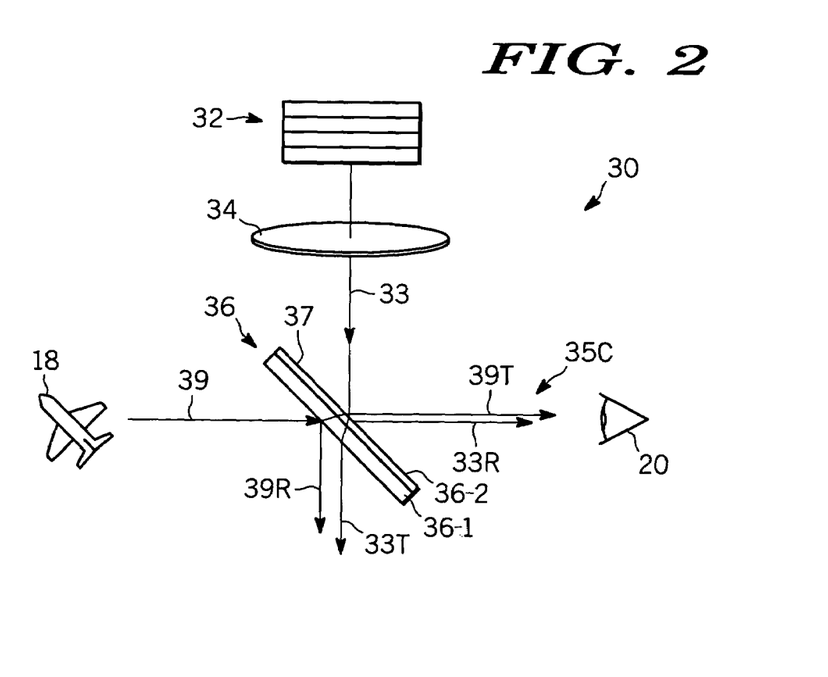
FIG. 2 is a simplified side view of a head-up display employing an LCD data display source, according to the present invention.

FIG. 2 is a simplified side view of head-up display 30 employing an LCD data display source 32, according to the present invention. Multilayer image source 32 produces data image 33 that is transferred by relay optics 34 to multilayer combiner 36. The exact nature and arrangement of the layers in data image source 32 are explained below in more detail in connection with FIGS. 4-7. Light rays 39 from background scene or object 18 arrive at combiner 36 and portion 39T is transmitted to user 20 and portion 39R is reflected. Any type of optical input may be used for supplying light rays 39. Similarly, data image 33 arrives at combiner 36 and portion 33R is reflected toward user 20 and portion 33T is transmitted. Combined optical image 35C is the superposition of reflected data image 33R and transmitted background image 39T. To observer 20 viewing combined optical signal or image 35C, data image 33R and background image 39T appear superimposed. The present invention differs from the prior art, among other things, in the construction and arrangement of data image source 32 and combiner 36. Rays 39 in FIGS. 2-3 are equivalent to rays 19 in FIG. 1.

Figure 3:
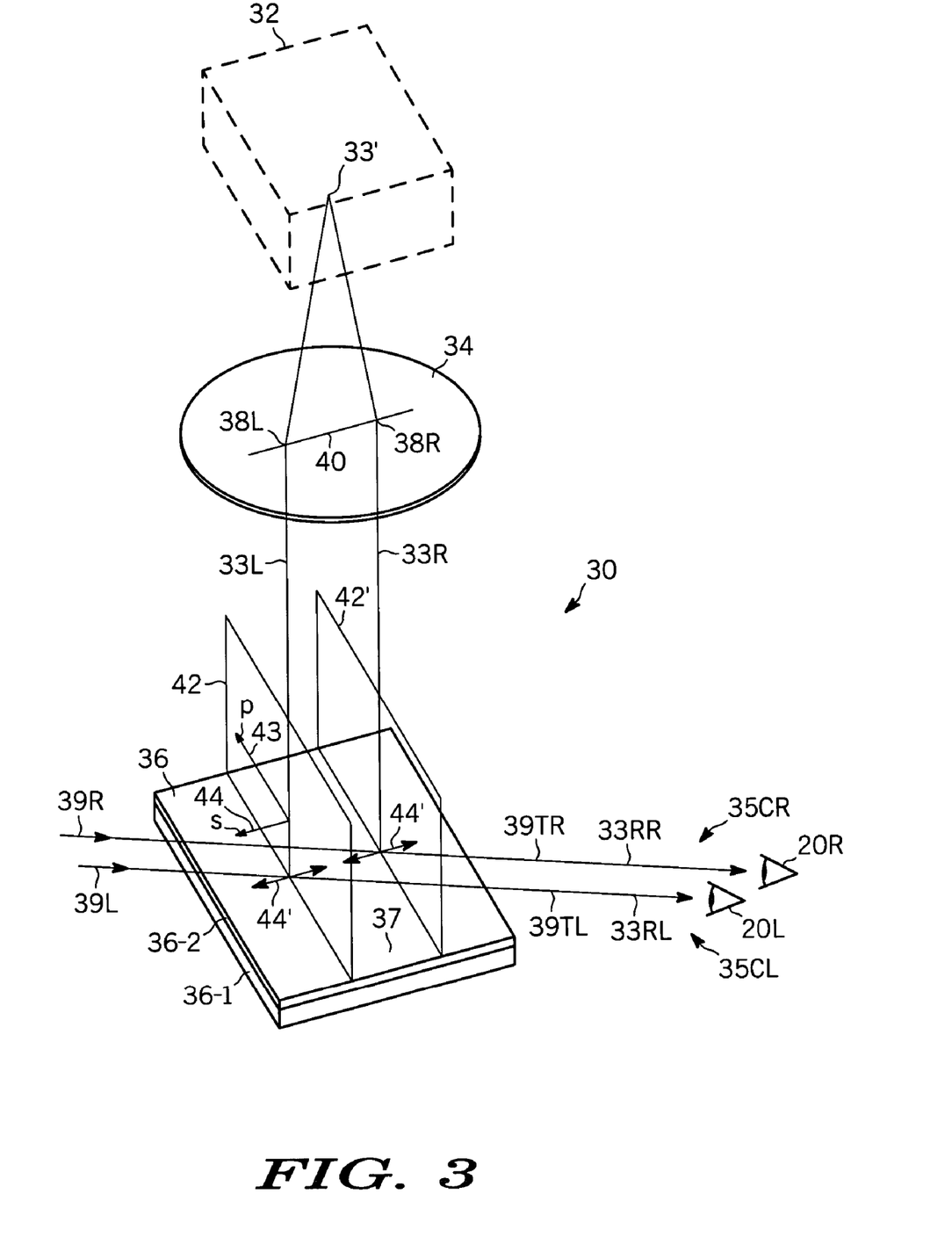
FIG. 3 shows a simplified perspective view of the head-up display of FIG. 2, illustrating binocular vision and light polarization.

FIG. 3 shows a simplified perspective view of head-up display 30 of FIG. 2 illustrating binocular vision and the desired light polarization. Data image source 32 is shown in phantom outline in FIG. 3 so that the light rays associated with binocular viewing may be more easily seen. In FIG. 3 it is assumed that viewer 20 has left-eye viewpoint 20L and right-eye viewpoint 20R receiving respectively left and right composite optical signals 35CL and 35CR. Left composite optical signal or image 35CL is composed of reflected portion 33RL of left data image ray 33L superposed on transmitted portion 39TL of left background image ray 39L, that is, 35CL equals 33RL plus 39TL. Similarly, right composite signal or image 35CR is composed of reflected portion 33RR of right data image ray 33R superposed on transmitted portion 39TR of right background image ray 39R. That is, 35CR equals 33RR plus 39TR. For convenience of explanation it is assumed that light 33L, 33R originates from common point 33' on data display 32 in FIG. 3, passing respectively through left vantage point 38L and right vantage point 38R. Line 40 connects vantage point pairs 38L, 38R. For convenience of illustration, the refraction of light rays 39 passing through combiner 36 is ignored in FIG. 3. It is also noted that the rays described represent nominal rays, and that there will generally be a range of ray angular directions and spatial positions associated with the optical signals.

It is noted that the light emitted by data display 32 is preferably polarized. The polarization of a light beam can be described by orthogonal components referred to as p-polarized and s-polarized light. When light strikes an optical surface, such as a beam splitter or combiner, the reflection and transmission characteristics depend upon the polarization of the incident beam. The polarization coordinate system is defined relative to surface 37 by planes 42, 42' containing incoming wavetrain 33 and reflected wavetrain 33R (e.g., input ray 33L and reflected ray 33RL in plane 42 and input ray 33R and reflected ray 33RR in plane 42'). Planes 42, 42' are normal to surface 37 of combiner 36 on which wavetrain 33 is impinging. P-polarization vector 43 lies in plane 42, 42' and s-polarization vector 44 is perpendicular to plane 42, 42'. Line 40 connecting vantage points 38L, 38R is parallel to s-polarization vector 44 and perpendicular to planes 42, 42'. Preferably, light 33 from data display 32 is s-polarized, that is, polarized so that polarization vector 44 is perpendicular to plane 42 and lies in the plane of surface 37 of combiner 36, as shown by arrows 44'.

Referring now to FIGS. 2-3 together, combiner 36 has base or substrate region 36-1 chosen to be highly optically transparent and of sufficient physical strength for the particular application. Substrate 36-1 is preferably made of glass, although other suitably transparent substrates such as plastic or crystalline materials may also be used. Surface layer 36-2 of combiner 36 facing toward data display 32 and observer 20 is chosen so as to enhance the reflection toward observer 20 of s-polarized light received from data display or image source 32. It is also desirable that transmission of any p-polarized light received from data display or image source 32 be enhanced. This will in general provide higher average transmission of the background scene image. A preferred method for achieving this is by tilting the combiner relative to input light ray 33 at the Brewster's Angle for any p-polarized light from data image source 32. Installation constraints will often limit the ability to tilt the combiner at Brewster's Angle, but in the preferred embodiment the angle would be set as close as practicable thereto in order to maximize the effect. What is preferable for the present invention is: (i) having preferential reflectance on the combiner for one polarization (e.g., s-polarization), where the reflectance of the combiner to that polarization is greater than the reflectance for other polarizations, and (ii) having a data image source polarized in a manner to take advantage of this preferential reflectance. Surface layer 36-2 is preferably a wavelength-tuned multilayer dielectric coating. Other compatible configurations include holographic reflectors, rugate filters, thin metallic films, metal-dielectric beam-splitters or stacked thick dielectric layers. The use of s-polarized light generated by data display 32 in combination with polarization sensitive reflection layer 36-2 enhances the luminance of data display light 33R directed toward viewer 20. Thus, the head-up display of the present invention provides greater luminance than prior art LCD based displays lacking these features while also allowing greater transmission of background scene image 18. If the additional luminance is not required, the increase in efficiency can be used to reduce the power consumption of the display, reduce the cooling requirements and/or allow a number of other system-related tradeoffs to be made. It should be noted that while combiner 36 in FIGS. 2-3 is depicted as a flat substrate, it may also be curved depending upon the optical design of the head-up display. Similarly, while FIGS. 2-3 depict light striking combiner 36 from above, other orientations may be used.

FIGS. 4-7 are simplified partially exploded views of various data image sources 32 useful in head-up display 30 of FIGS. 2-3 of the present invention, according to different exemplary embodiments 32-1, 32-2, 32-3, 32-4. Arrow 60 points in the direction of the viewer, that is, in direction 33 in FIGS. 2-3 and indicates the light rays or direction of the light beam exiting data display 32. In FIGS. 4-7 the various elements making up data display 32 are shown slightly spaced-apart for convenience of description. In use, they are ordinarily assembled as a compact stack or sandwich-like structure. Small, double-headed arrows are used therein to illustrate the direction of polarization of the light exiting from a particular layer or region. Various directions (angular orientation) of polarization are referred to, assuming that the zero angle axis is parallel to the upper and lower edges of the elements in FIGS. 4-7, but this is merely for convenience of explanation and different angles or reference may be used depending upon the needs of a particular display, provided that the resulting light output from data display 32 is s-polarized as indicated schematically by arrows 61 in FIGS. 4-7 and by arrows 44, 44' in FIG. 3. Backlight 50 is common to all elements 32 of FIGS. 4-7 and is assumed for purposes of explanation to emit unpolarized light. For convenience of explanation, the convention is adopted herein of referring to only one orientation (e.g., 45 degrees) of polarization when the polarization angle arrows shown in FIGS. 4-7 also point in the opposite direction (e.g., 225 degrees). Thus, the single polarization angle mentioned is intended to include the opposite angle as well.

Figure 4:
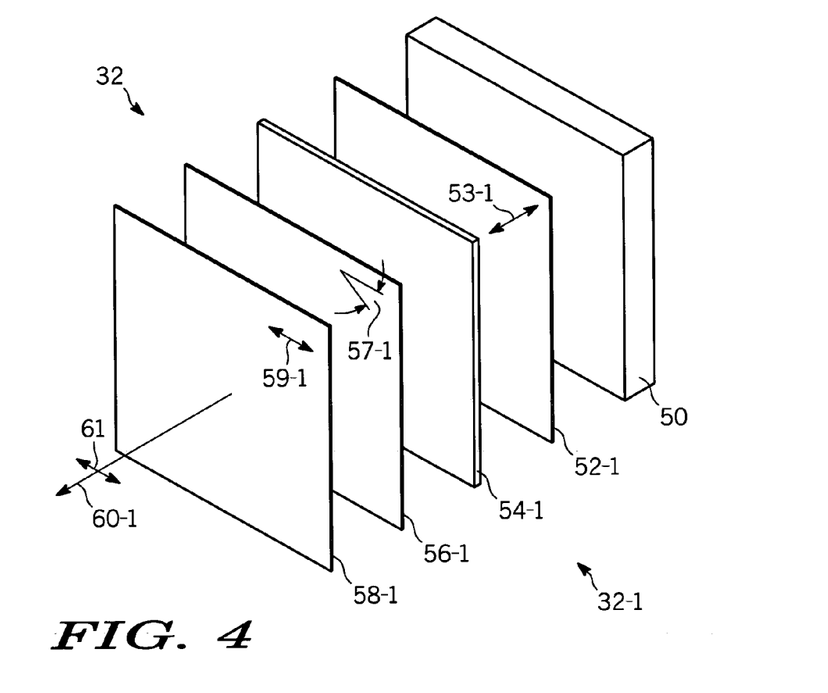
FIGS. 4-7 are simplified partially exploded views of various data image sources useful in the head-up displays of FIGS. 2-3 of the present invention, according to different embodiments.

Referring now to FIG. 4 there is illustrated data image source 32-1 comprising backlight 50, rear polarizer 52-1, liquid crystal layer 54-1, polarization rotating element 56-1 and front polarizer 58-1. As shown by arrows 53-1, rear polarizer 52-1 rotates or otherwise establishes the direction of polarization of the light being emitted from it at about 45 degrees. Liquid crystal layer 54-1 preferably comprises a twisted nematic liquid crystal (LC) material. It rotates the polarization angle of the light passing through it by different amounts in different regions according to whether or not its various electrodes are energized. This is well understood. Front polarizer 58-1 has its direction of polarization, as indicated by arrows 59-1, such that light 60-1 emitted therefrom is s-polarized as indicated by arrows 61. Polarization rotating element 56-1 is conveniently provided between liquid crystal layer 54-1 and front polarizer 58-1 to provide additional rotation needed to accommodate the combined effect of rear polarizer 52-1 and liquid crystal layer 54-1 so that the majority of the optical signal desired to be transmitted is able to pass through front polarizer 58-1 to form s-polarized beam or image 60-1. In the embodiment of FIG. 4 as shown, polarization rotating element 56-1 is preferably a half-wave retardation film oriented at angle 57-1, for example 22.5 degrees, with respect to the front polarizer direction of polarization 59-1. The arrangement of FIG. 4 provides the desired s-polarization output from the data display while maintaining compatibility with many conventional liquid crystal display parameters, such as 90 degree twist angle, 45 degree alignment layer angles and anti-reflection coated polarizers.

Figure 5:
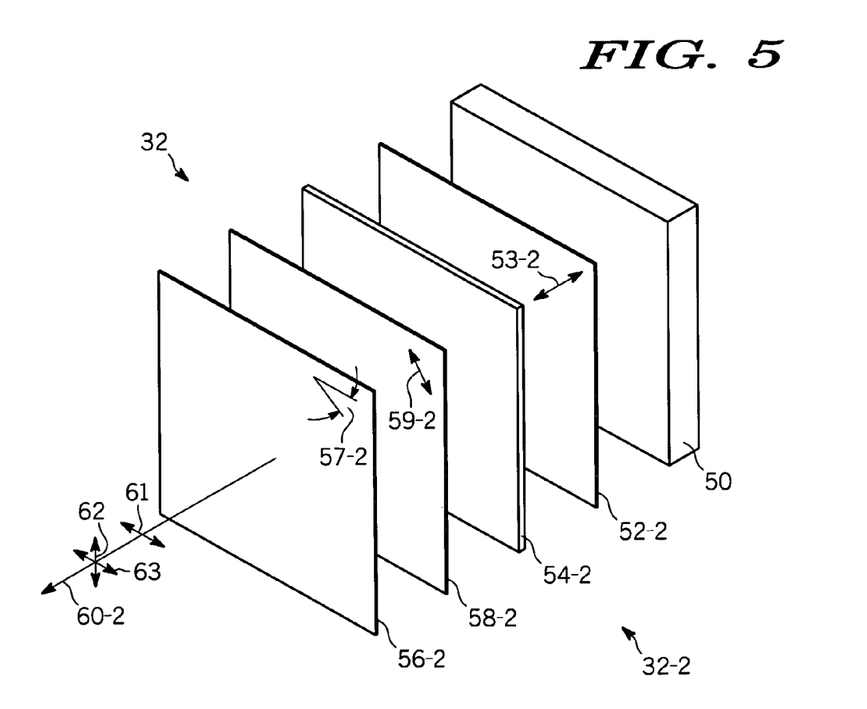

Referring now to FIG. 5, data display 32-2 contains substantially similar elements as in display 32-1 of FIG. 4, but arranged in a slightly different order. Light from backlight 50 passes through rear polarizer 52-2 with polarization angle 53-2 (e.g., ~45 degrees) and thence through selected regions of liquid crystal (LC) layer 54-2. Persons of skill in the art understand that the regions of layer 54-2 that cause the light to be blocked or transmitted in this and the other implementations illustrated herein depend upon the electrical excitation of layer 54-2 and equivalent layers. For data display 32-2, front polarizer 58-2 with polarization angle 59-2 (e.g., 135 degrees) is next followed by polarization rotator 56-2, preferably a half-wave retardation film oriented at angle 57-2, which provides the rotation angle (e.g., 45 degrees) needed so that output beam 60-2 has s-polarization 61 at, e.g., zero degrees in this example. The configuration described is representative of a preferred embodiment incorporating one type of ninety degree twisted nematic LCD, which can be further described as having a viewing angle symmetry axis 62 and non-symmetry axis 63. Rotation about viewing angle symmetry axis 62 yields substantially symmetric luminance performance, as will be described more clearly with reference to FIGS. 8-9. Rotation about non-symmetry axis 63 yields non-symmetric luminance performance. The arrangement of FIG. 5 has the advantage that conventional polarizers and compensation films can be used, with the added polarization rotator located externally to the conventionally arranged polarized display. While the embodiment of FIG. 5 has been described in the context of a twisted nematic LCD, numerous other LCD modes may be substituted, including but not limited to super-twisted nematic, electrically controlled birefringence, bend mode, in-plane nematic or vertically aligned mode. In each of these variations, the particular polarizer angles may be different, but polarization rotator 56-2 is adjusted accordingly to ensure that output beam 60-2 has s-polarization 61. Each display type will also in general have viewing angle symmetry axis 62 and may have non-symmetry axis 63.

Figure 6:
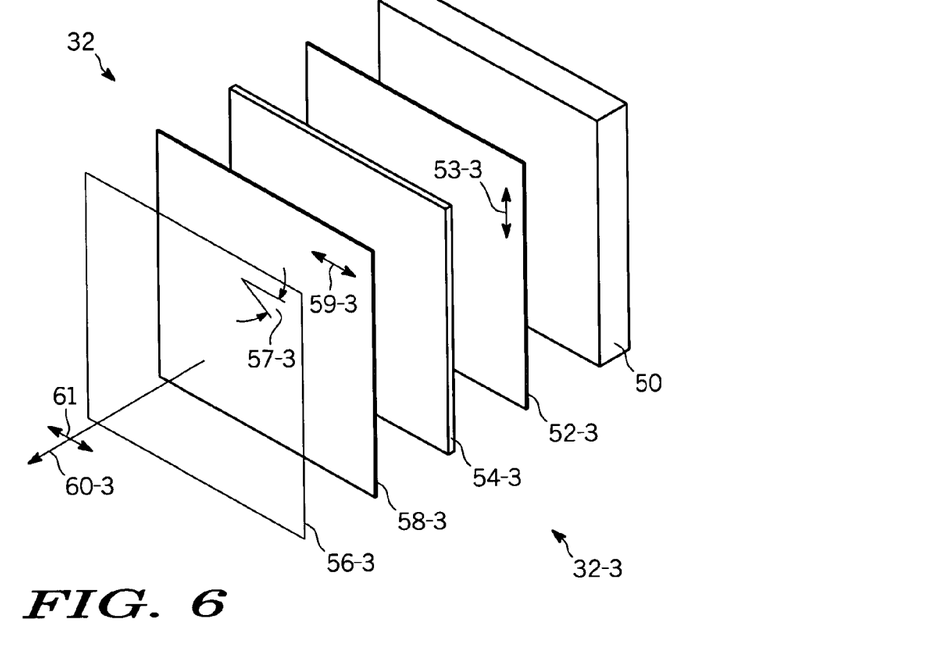

Referring now to FIG. 6, data display 32-3 contains somewhat similar elements as in display 32-1 of FIG. 4, but illustrating different polarization angles. Light from backlight 50 passes through rear polarizer 52-3 with polarization angle 53-3 (e.g., 90 degrees) and thence through selected regions of liquid crystal (LC) layer 54-3. LC layer 54-3 is configured to selectively rotate polarization between these two polarization angles, and in the present embodiment is preferably an in-plane nematic liquid crystal layer, as this liquid crystal configuration provides a more symmetric transmittance characteristics at these polarizer angles. Other conventional liquid crystal configurations such as twisted nematic, super-twisted nematic, electrically controlled birefringence, bend mode or vertically aligned mode may alternately be used, although with reduced binocular symmetry as described in more detail below. Accordingly, front polarizer 58-3 has polarization angle 59-3 of zero that is parallel to desired s-polarization direction 61. Polarization rotator 56-3, for example a half-wave retarder oriented at angle 57-3, is optional. With the polarization orientation described, polarization rotation layer 56-3 is ordinarily not needed. However, polarization rotator 56-3 may be useful if the output polarization angle differs from the s-polarization direction.

Figure 7:
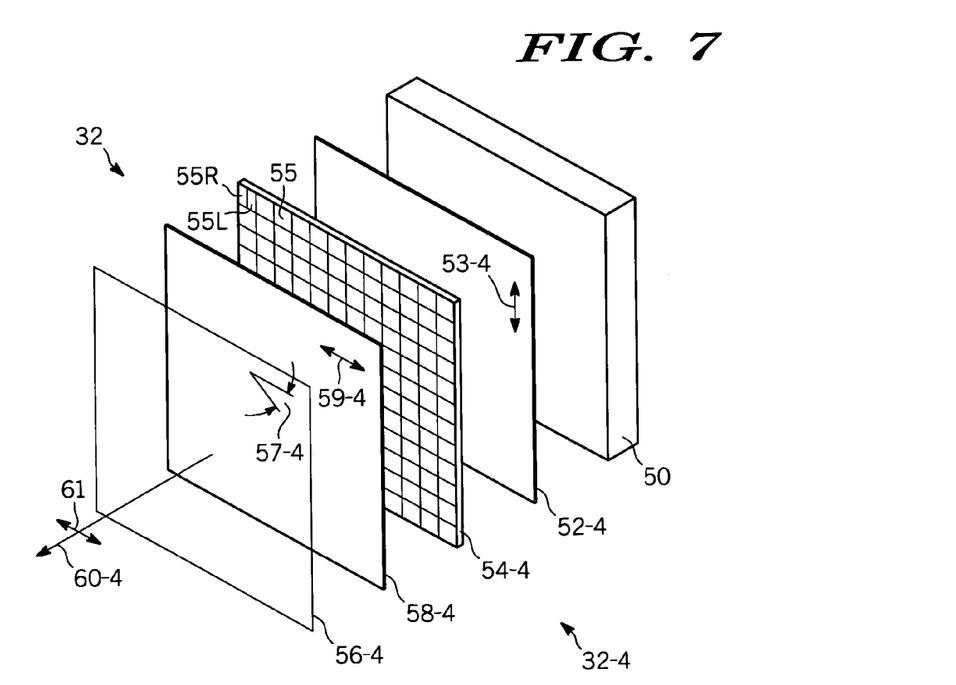

Referring now to FIG. 7, data display 32-4 contains somewhat similar elements as in display 32-3 of FIG. 6, but illustrating further type of LC layer 54-4. Light from backlight 50 passes through rear polarizer 52-4 with polarization angle 53-4 (e.g., 90 degrees) and thence through selected regions of liquid crystal (LC) layer 54-4. LC layer 54-4 is conveniently a multiple domain LC layer and as such has different polarization rotation properties than LC layers 54 in FIGS. 4, 5, 6. LC layer 54-4 is divided into multiple pixels 55, each of which has at least a first domain 55L and second domain 55R. The at least two domains are arranged to have complementary viewing angle response so that when viewed from different vantage points, for example by an observer with binocular vision, the left and right domain responses average to provide a more uniform result for different viewing angles. The effect of asymmetry in LC layers as a function of viewing angle is discussed more fully in connection with FIGS. 8-9. In the embodiment of FIG. 7, the use of complementary domains allows the polarization axes to be chosen independently of the binocular vantage points, since asymmetry effects are largely averaged out. Any of the previously described LC modes may be used within the individual domains. Front polarizer 58-4 conveniently has polarization angle 59-4 of zero, that is, parallel to desired output s-polarization direction 61. With multiple domain nematic LC layer 54-4, polarization rotation layer 56-4 may not be not needed. Thus, polarization rotator 56-4 providing rotation angle associated with orientation 57-4 is optional. Layer 56-4 is useful, for example, if polarization angle 59-4 differs from the s-polarization direction 61. While polarization rotation layer 56-3 and 56-4 in FIGS. 6-7 are shown as being the outermost layer, this is merely for convenience of explanation and is not essential. The order of layers 56 and 58 in FIGS. 4-7 may be interchanged. The arrangement of FIG. 7 has the advantage that the output polarization angle can be oriented in the most efficient direction without adversely impacting the symmetry between right and left views for a binocular observer Rear polarizers 52 and front polarizers 58 are preferably standard iodine or dye-based film polarizers commonly used in liquid crystal displays. Other types of polarizers, including non-absorbing polarizers, may also be used. Polarization rotating elements 56 can take several forms, as for example, and not intended to be limiting, a half wave retardation film, a twisted optical axis retarder, a stack of retardation films or plates, or other types of polarization rotating elements well known in the art. Suitable polarizers and polarization rotating elements can be obtained from Nitto Denko America, Inc. in Fremont, Calif. Polycarbonate films having a half wave retardance over the backlight spectral band are preferred.

Figure 8:
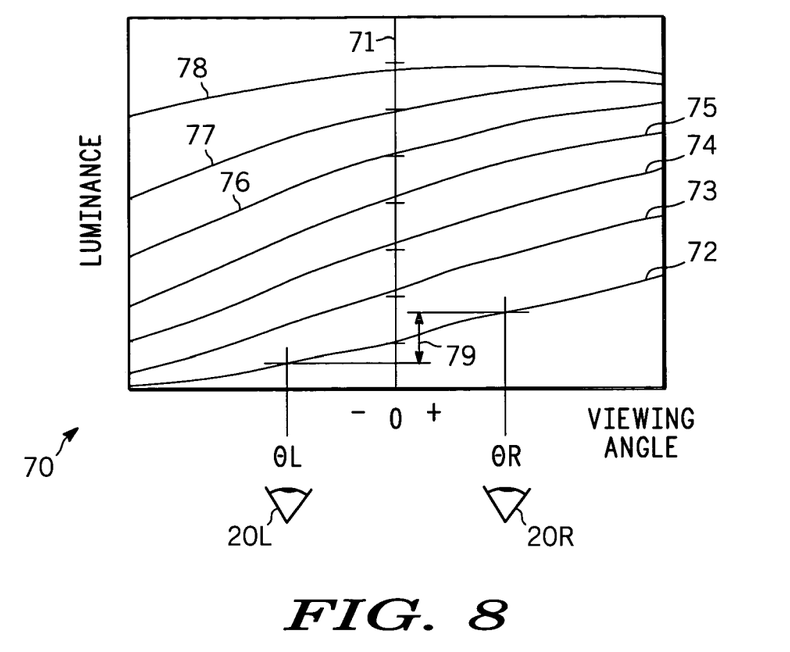
FIGS. 8-9 are plots of LCD luminance versus viewing angle about non-symmetry and symmetry axes, respectively, at different drive levels.
Figure 9:
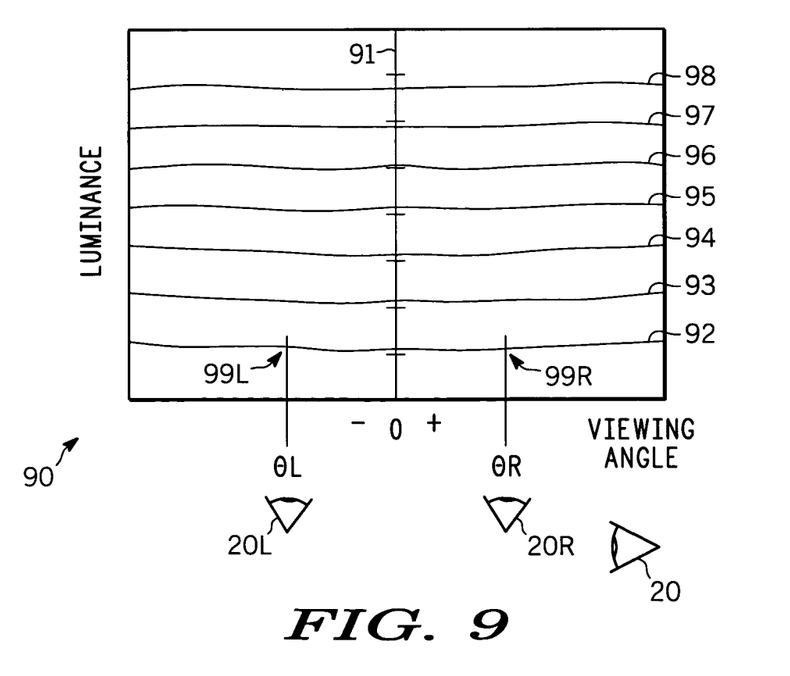

FIGS. 8-9 show plots 70, 90 of typical LCD luminance versus viewing angle about non-symmetry and symmetry axes at different LCD drive levels 72-78, 92-98, respectively. FIG. 5 illustrates exemplary data display 32-2 having symmetry axis 62 and non-symmetry axis 63. The exemplary curves shown in FIGS. 8-9 are derived from a twisted nematic arrangement consistent with FIG. 5, but are representative of the type of performance seen in many other single domain LCD technologies as well. The case of binocular viewing is also depicted in FIGS. 8-9, for two different orientations of data display 32-2 or LC layer 54-2. Binocular observer 20 has left eye 20L at viewing angle θL and right eye 20R at viewing angle θR with respect to lines 71, 91. FIG. 8 depicts the viewing angle performance for rotation about non-symmetry axis 63, where the apparent luminance behavior is asymmetric about zero viewing angle as represented by line 71. The right and left eye angles would apply if non-symmetry axis 63 were perpendicular to line 40 (in FIG. 3) connecting the right and left eye vantage points. For example, referring to FIG. 8, at LC drive level 72, the luminance perceived by left eye 20L is less than that perceived by right eye 20R by amount 79. Furthermore, the disparity can vary significantly with drive level and average viewing angle. FIG. 9 shows the situation where viewing angle symmetry axis 62 is perpendicular to line 40 connecting the right and left eye vantage points as well as perpendicular to polarization direction 44 in FIG. 3 and direction 61 in FIGS. 4-7, of the light output from the data display. In FIG. 9 the luminance performance resulting from the liquid crystal layer is arranged to have symmetrical behavior with respect to zero viewing angle, represented by line 91. In this case, the data display is viewing angle symmetric for the binocular vantage point pair, meaning that luminance is practically independent of viewing angle and both left and right eyes see images of substantially similar luminance, e.g. 99L, 99R, that does not change significantly with drive level. Symmetrical performance is preferred in the binocular embodiments shown, to avoid the situation where the two eyes would see non-matching images. Symmetry or lack of symmetry is intrinsic to the LCD design, and is not readily separable from the polarizer orientation. For example, the symmetry axis of a standard twisted nematic LCD is at 45 degrees from the polarizer axes, consistent with the LCD and symmetry geometries depicted in FIG. 5. Rotation of the liquid crystal and polarization axes, as in the embodiment of FIG. 6, achieves the goal of increased efficiency but does not maintain binocular symmetry unless a more symmetric LCD mode such as in-plane nematic is used. The polarization rotator embodiments of FIG. 4 or FIG. 5 and the multiple domain embodiment of FIG. 7 are provided to simultaneously meet both the increased efficiency and binocular symmetry objectives. The structure and prescribed orientations illustrated in FIG. 7 can achieve both objectives of increased luminance and binocular symmetry, by providing an appropriately oriented symmetric LCD where domains 55L, 55R of each pixel 55 are arranged to have complementary asymmetry. For example, if domain 55L has asymmetry of the type shown in FIG. 8, i.e., luminance increases with positive increase in viewing angle at constant drive, then domain 55R is arranged to have asymmetry where luminance decreases with positive increase in viewing angle (e.g., as if FIG. 8 is flipped left to right). In this manner, the viewer receives a combined response, which is approximately the average of the two domains for each pixel. Complementary LC regions are provided, for example, by patterning the liquid crystal alignment features and are well known in the art.

A method is provided for presenting combined optical image 35C in a head-up display. The method comprises, in either order generating data image 33 having s-polarization with respect to surface 37 of combiner 36 and receiving background scene image 39, and then directing both data image 33 and the background scene image 39 to tilted plate combiner 36, then selectively reflecting the s-polarized image 33R toward viewer 20 while transmitting background scene 39T toward viewer 20 who perceives them as combined image 35C (e.g., 35CR for right vantage point 30R and 35CL for left vantage point 20L).

Advantages of the invented arrangement are that it provides for improved optical efficiency of the HUD system while maintaining binocular symmetry for viewing from pairs of vantage points. It also provides an arrangement having maximum see-through transmittance for viewing the pairs of vantage points after passing through the combiner from the opposite side, that is, the background or far-field image side. A further benefit of the invented arrangement is that it minimizes light leakage through the combiner from the rest of the head-up display and also minimizes reflectance of ambient light from the forward scene, thereby avoiding spreading unwanted light into the viewer's environment, such as a flight deck or cockpit of an aircraft or motor vehicle, which can be distracting to the viewer(s).

While at least one exemplary embodiment has been presented in the foregoing detailed description, it should be appreciated that a vast number of variations exist, particularly as to how to provide data display 32. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. For example, what is important is that data display 32 be able to provide the desired data image in the form of s-polarized light relative to the combiner and that data display and combiner 36 be arranged so that the s-polarization vector lies in the plane of surface 37 of combiner 36 facing toward viewer 20. In a further variation, polarization-rotating element 56 is chosen to be wavelength selective. Such elements are similar to other polarization-rotating elements but with special attention to spectral properties such as high dispersion, multiple orders or specially tuned retarder stacks. U.S. Pat. No. 5,953,083 describes one method of providing such performance. This allows the desired spectral band to be preferentially reflected by combiner 36 by arranging for it to be rotated to s-polarization relative to combiner 36. Other wavelength bands not aligned with s-polarization relative to surface 37 of comber 36 are not preferentially reflected to viewer 20. Additional polarizers can be used to enhance the selectivity. It should be understood that various changes can be made in the function and arrangement of elements without departing from the scope of the invention as set forth in the appended claims and the legal equivalents thereof. What is important is that the data image light be s-polarized with respect to combiner 36. While use of selective reflectance film 36-2 is convenient, any means for providing preferential reflection of s-polarized data image light can be used. Any arrangement able to provide such light polarization and selective reflectance is useful.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A head-up display combining at least first and second images so as to be simultaneously visible to a viewer having a right eye vantage point and a left eye vantage point, the viewer looking at the head-up display, comprising:
   a data display source configured to supply the first image such that the first image has a direction of polarization, wherein the data display source has a viewing angle symmetry axis that is perpendicular to the direction of polarization of the first image and to a line that connects the right eye vantage point and the left eye vantage point;
   an optical input configured to supply the second image; and
   a combiner coupled to the data display source and the optical input, the combiner configured to reflect the first image toward the viewer and transmit the second image toward the viewer, wherein the first image is substantially s-polarized with respect to the combiner.

2. The display of claim 1 wherein the surface layer is configured to receive and reflect the first image, the combiner further comprising a supporting optically transparent body under the surface layer, wherein the surface layer and the body have different optical properties such that the surface layer preferentially reflects s-polarized light received from the data display toward the viewer.

3. The display of claim 2 wherein the combiner preferentially transmits p-polarized light.

4. The display of claim 1 wherein the data display source comprises:
   a backlight;
   a rear polarizer coupled to the backlight;
   a liquid crystal layer coupled to the rear polarizer; and
   a front polarizer coupled to the liquid crystal layer.

5. The display of claim 4 further comprising a polarization-rotating element coupled to the front polarizer.

6. The display of claim 5 wherein the polarization-rotating element is optically after the front polarizer.

7. The display of claim 5 wherein the polarization-rotating element is optically before the front polarizer.

8. The display of claim 4 further comprising a polarization-rotating element coupled between the liquid crystal layer and the front polarizer.

9. The display of claim 4 wherein the liquid crystal layer comprises an in-plane nematic liquid crystal material.

10. The head-up display of claim 4, wherein the liquid crystal layer has pixels, and each pixel has at least two domains arranged to have complementary viewing angle response with respect to the viewing angle symmetry axis.

11. The display of claim 1 wherein the combiner is tilted at an angle so as to approach the Brewster Angle for transmitted p-polarized light from the data image source.

12. The display of claim 1 wherein the combiner is tilted at an angle so as to approach the Brewster Angle for light from the optical input for the second image.

13. The display of claim 1 wherein the data display source is substantially viewing angle symmetric for binocular vantage point pairs associated with the viewer.

14. The display of claim 1 wherein the first image has a direction of polarization and the data display source has a viewing angle symmetry axis that is perpendicular to the direction of polarization of the first image.

15. The head-up display of claim 1, wherein the combiner comprises a surface layer comprising a structure selected from the group consisting of a wavelength-tuned multilayer dielectric coating, a holographic reflector, and a rugate filter.

16. A head-up display for a viewer having a right eye vantage point and a left eye vantage point, the display comprising:
   a source configured to emit first light containing a data image, the data image having a direction of polarization, wherein the source has a viewing angle symmetry axis that is perpendicular to the direction of polarization of the data image and to a line that connects the right eye vantage point and the left eye vantage point;
   an optical input configured to emit second light derived from a forward scene; and
   a combiner configured to having at least a first surface and superpose the first and second light to thereby provide a combined image, and,
   wherein the first light is s-polarized with respect to the first surface of the combiner.

17. The display of claim 16 wherein the first surface of the combiner optically faces toward the source for providing the first light and toward a viewer of the combined image.

18. The display of claim 16 wherein the first surface comprises a layer that selectively reflects the s-polarized light.

19. The display of claim 18 wherein the source for providing the first light comprises:
   a backlight;
   a first polarizer coupled to and receiving light from the backlight;
   a liquid crystal containing layer coupled to and receiving light from the first polarizer;
   a second polarizer coupled to and receiving light from the liquid crystal containing layer.

20. The display of claim 19 further comprising a wavelength selective polarization-rotating element coupled to the second polarizer.

21. A head-up display for supplying a combined image to a viewer having a right eye vantage point and a left eye vantage point, comprising:
   a data image display configured to supply a first part of the combined image, the first part having a direction of polarization, wherein the data image display has a viewing angle symmetry axis that is perpendicular to the direction of polarization of the first part and to a line that connects the right eye vantage point and the left eye vantage point;
   an optical input configured to supply a second part of the combined image;
   a combiner configured to receive and combine the first and second parts to provide the combined image to the viewer,
   wherein the combiner has thereon a selective reflectance region that preferentially reflects s-polarized light of the first part in a wavelength region of interest and preferentially transmits p-polarized light incident thereon, and
   wherein the data image display comprises a backlight, an LC layer and two or more polarizers oriented so that data images in the first part directed toward the combiner are s-polarized with respect to the selective reflectance region of the combiner; and
   a polarization rotation element coupled to the data image display.

22. The head-up display of claim 21 wherein the data image display is substantially viewing angle symmetric for binocular vantage point pairs associated with the viewer.

23. The head-up display of claim 21 wherein the data image display has a viewing angle symmetry axis that is perpendicular to the s-polarized light of the first part.

* * * * *

UNITED STATES PATENT AND TRADEMARK OFFICE
CERTIFICATE OF CORRECTION

| | |
|---|---|
| PATENT NO. | : 7,482,996 B2 |
| APPLICATION NO. | : 10/879882 |
| DATED | : January 27, 2009 |
| INVENTOR(S) | : Brent D. Larson et al. |

It is certified that error appears in the above-identified patent and that said Letters Patent is hereby corrected as shown below:

Column 10, line 10, "eve" should be changed to --eye--;
Column 10, line 11, "eve" should be changed to --eye--.

Signed and Sealed this

Twenty-third Day of June, 2009

JOHN DOLL
*Acting Director of the United States Patent and Trademark Office*